United States Patent
Wang et al.

(10) Patent No.: US 9,209,858 B2
(45) Date of Patent: Dec. 8, 2015

(54) METHOD AND APPARATUS FOR DETERMINING UPLINK NOISE POWER IN A WIRELESS COMMUNICATION SYSTEM

(75) Inventors: Jerry Zhenyu Wang, Bethlehem, PA (US); Kumud Kumar Sanwal, Edison, NJ (US); Jonqyin Sun, Randolph, NJ (US); Kai Xie, North Brunswick, NJ (US); Susan M. Miller, Whitehouse Station, NJ (US); Marc E. Shelton, Somerset, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 111 days.

(21) Appl. No.: 13/084,901

(22) Filed: Apr. 12, 2011

(65) Prior Publication Data

US 2012/0263046 A1    Oct. 18, 2012

(51) Int. Cl.
H04B 1/7097    (2011.01)

(52) U.S. Cl.
CPC .................................. *H04B 1/7097* (2013.01)

(58) Field of Classification Search
None
See application file for complete search history.

(56) References Cited

U.S. PATENT DOCUMENTS

| | | | | |
|---|---|---|---|---|
| 7,782,820 | B2 | 8/2010 | Dominique et al. | |
| 8,000,655 | B2* | 8/2011 | Wang et al. | 455/63.1 |
| 2002/0015438 | A1* | 2/2002 | Ishizu et al. | 375/147 |
| 2002/0101832 | A1 | 8/2002 | Chen et al. | |
| 2002/0136278 | A1* | 9/2002 | Nakamura et al. | 375/148 |
| 2002/0196879 | A1* | 12/2002 | Iochi | 375/346 |
| 2003/0142730 | A1 | 7/2003 | Lin | |
| 2004/0057502 | A1 | 3/2004 | Azenkot et al. | |
| 2004/0091034 | A1 | 5/2004 | Shiu et al. | |
| 2005/0128985 | A1* | 6/2005 | Liberti et al. | 370/335 |
| 2005/0207475 | A1* | 9/2005 | Bar-Ness et al. | 375/141 |
| 2008/0075046 | A1* | 3/2008 | Dominique et al. | 370/335 |
| 2008/0130731 | A1 | 6/2008 | Shiu et al. | |
| 2008/0304554 | A1* | 12/2008 | Fulghum et al. | 375/149 |
| 2009/0323777 | A1* | 12/2009 | Wang et al. | 375/148 |
| 2010/0202382 | A1* | 8/2010 | Park et al. | 370/329 |
| 2010/0260231 | A1* | 10/2010 | Ringstom et al. | 375/130 |
| 2011/0158293 | A1 | 6/2011 | Shiu et al. | |
| 2011/0244893 | A1* | 10/2011 | Wang et al. | 455/458 |
| 2012/0258763 | A1* | 10/2012 | Bjorkegren et al. | 455/522 |

FOREIGN PATENT DOCUMENTS

| | | |
|---|---|---|
| CN | 101371456 A | 2/2009 |
| JP | 2003-510889 A | 3/2003 |
| JP | 2005-012830 A | 1/2005 |
| JP | 2010-504065 A | 2/2010 |
| WO | WO 2004/045096 | 5/2004 |
| WO | WO-2008/057018 A1 | 5/2008 |

(Continued)

OTHER PUBLICATIONS

International Search Report and Written Opinion dated Jun. 27, 2012 for International Application No. PCT/US2012/032850.

(Continued)

*Primary Examiner* — Chirag Shah
*Assistant Examiner* — Amar Persaud
(74) *Attorney, Agent, or Firm* — Harness, Dickey & Pierce, P.L.C.

(57) ABSTRACT

In one embodiment, the method includes receiving signals from user equipment, despreading the received signals by applying an unused channelization code, and determining the uplink noise power based on output of the despreading.

9 Claims, 5 Drawing Sheets

(56) References Cited

FOREIGN PATENT DOCUMENTS

WO    WO-2010/117328 A1    10/2010
WO    WO-2011/011994 A1    2/2011

OTHER PUBLICATIONS

Won, et al., "An Unbiased Signal-to-Interference Ratio Estimator for the High Speed Downlink Packet Access System" ETRI Journal, vol. 25, No. 5 (pp. 418-421), Oct. 2003.

Korean Office Action dated Sep. 16, 2014 for corresponding Korean Application No. 10-2013-7026783.

International Search Report (PCT/ISA/210) dated Jul. 2, 2012 for International Application No. PCT/US2012/032854.

Written Opinion of the International Searching Authority (PCT/ISA/237) dated Jul. 2, 2012 for International Application No. PCT/US2012/032854.

Notification of Transmittal of ISR and WO (PCT/ISA/220) dated Jul. 2, 2012 for International Application No. PCT/US2012/032854.

Chinese Office Action dated Aug. 26, 2014 for corresponding Chinese Application No. 201280018131.1.

Qualcomm Incorporated, "UL Power Control for Multicarrier Operation," 3GPP TSG RAN WG1 #59bis, 2010.

Japanese Office Action mailed Dec. 25, 2014 for corresponding JP Application No. 2014-505206.

Second Chinese Office Action for corresponding Chinese Patent Application No. 201280017994.7, dated Jan. 6, 2015, and English translation thereof.

Panasonic, Signalling of power limit situation of UE (Revised from R1-040321 [online], 3GPP TSG-RAN WG 2#41 R2-040622, Internet URL: <http://www.3gpp.org/ftp/tsg_ran/WG2_RL2/TSGR2_41/Docs/R2-040622.zip>, Feb. 2004.

Motorola, Power Scaling for LTE-A [online], 3GPP TSG-RAN WG1#61 R1-103169, Internet URL: <http://www.3gpp.org/ftp/tsg_ran/WG1_RL1/TSGR1_61/Docs/R1-103169.zip>, May 2010.

Japanese Office Action mailed Oct. 20, 2015 for corresponding JP Application No. 2014-505206.

\* cited by examiner

METHOD AND APPARATUS FOR DETERMINING UPLINK NOISE POWER IN A WIRELESS COMMUNICATION SYSTEM

BACKGROUND OF THE INVENTION

In a communication system, a received waveform from a user equipment is a mixture of signal and noise. How to separate the signal and noise power from the received waveform is a fundamental technique for uplink receiver performance.

As an example, FIG. 1 illustrates a channel model for a Wideband Code Division Multiple Access (WCDMA) system. Here, a user equipment (UE) has multiple concurrent channels, such as Sc(t) for a control channel signal and Sd(t) for a data channel signal. While the UE may send many concurrent channels, only two channels are shown for the sake of brevity and simplicity of disclosure. In particular, the UE applies respective orthogonal codes at spreaders 10, 12 for each signal, and a transmitter 14 transmits the multiple signals over a medium such as an air interface. Noise n(t) is an additive channel noise added by transmission over the medium. A base station or NodeB therefore receives the following waveform at its receiver 20:

$$x(t) = Sc(t) + Sd(t) + n(t)$$

To accurately receive the desired signals, the signal power and noise power are separated from the received waveform in x(t). Signal power and noise power may be defined as:

Noise Power:
$E[n^2]$=function of x(t) for a symbol
Control Signal Power:
$E[Sc^2]$=function of x(t) for a symbol
Data Signal Power:
$E[Sd^2]$=function of x(t) for a symbol This separation problem is a classic problem in communication theory. FIG. 2 illustrates an existing solution applied in a WCDMA system. This solution applies a correlation function based algorithm. For the sake of brevity and simplicity, FIG. 2 shows this solution applied to the control signal only. As shown, a control channel despreader 30 despreads the received antenna waveform x(t) using the orthogonal code associated with the control channel. Accordingly, the output y(k) from the despreader 30 is the control signal and noise, while the data signal has been canceled. The output symbol is:

$$y(k) = Sc(k) + n(k), \text{ where } k \text{ is a symbol index.}$$

A delay 32 delays the output symbol such that a multiplier 34 multiplies the current and previous outputs symbols to obtain the control signal power. Namely, the control signal power is determined based on correlation function:

$$\begin{aligned} E[Sc^2] \sim &= y(k) * y(k-1) \\ &= [Sc(k) + n(k)] * [Sc(k-1) + n(k-1)] \\ &= Sc(k)Sc(k-1) + \{Sc(k)n(k-1) + Sc(k-1)n(k) + n(k)n(k-1)\} \\ &= Sc(k)Sc(k-1) + o_c(Sc, n) \\ &\rightarrow Sc^2 \end{aligned}$$

where $o_c(Sc,n) = Sc(k)n(k-1) + Sc(k-1)n(k) + n(k)n(k-1)$ is called a correlation remainder.

In FIG. 2, the noise power is also calculated based on correlation function. Here, a power determination unit 36 determines the power of the output symbol and then a combiner 38 subtracts the control signal power output by the multiplier 34 from the output symbol power as shown in the expression below to obtain the noise power:

$$\begin{aligned} E[n^2] \sim &= y(k)^2 - y(k)y(k-1) \\ &= [Sc(k) + n(k)]^2 - [Sc^2 + o_c(Sc, n)] \\ &= [Sc(k)^2 + n(k)^2 + 2Sc(k)n(k)] - [Sc^2 + o_c(Sc, n)] \\ &= n(k)^2 + o_n(Sc, n) \\ &\rightarrow n^2 \end{aligned}$$

where $o_n(Sc, n) = 2Sc(k)n(k)] - o_c(Sc, n)$ is also called correlation remainder. A first average unit 40 determines the average noise power of a desired number of symbols, and a second average unit 42 determines the average control signal power over the desired number of symbols.

This process provides meaningful output if the following assumptions stand:

Assumption 1: $o_c(Sc, n) = 0$ and $o_n(Sc, n) = 0$, which means that the correlation remainders are zero.

Assumption 2: $Sc(k)Sc(k-1) = Sc^2$, which implies that we pre-know the signal bits, such as pilot bits.

The assumption 1 means that all the correlation items between signal and noise, noise and noise are zero. The assumption 2 means that all the signal bits are pre-known.

These two assumptions are two of the root causes of performance limitations in the existing solution. The assumption 1 stands only if it has an infinite number of symbols for the average. This implies that the algorithm's adapting speed is slow. The performance will be limited if the number of symbols for the average is too small. In practice, the fast changing nature of the transmission power, the fast closed loop updating speed, and the fast channel fading may result in that only a few symbols are available for the averaging. This is not enough to meet the assumption 1 requirement for a high performance receiver.

As for assumption 2, this assumption requires that the signal bits are pre-known. This further limits application of the existing solution to a pilot signal. Unfortunately, the pilot bits are very limited in communication links, particularly, the uplink.

SUMMARY OF THE INVENTION

At least some example embodiments relate to a method of determining uplink noise power in a wireless communication system.

In one embodiment, the method includes receiving signals from user equipment, despreading the received signals by applying an unused channelization code, and determining the uplink noise power based on output of the despreading.

For example, the unused channelization code is selected from a set of orthogonal channelization codes.

In one embodiment, the method further includes canceling noise power from power of at least one of the received signals based on the determined uplink noise power.

In one embodiment, the at least one of the received signals is a data signal.

In one embodiment, the at least one of the received signals is a control signal.

In one embodiment, the method further includes determining whether the user equipment is operating in a power limited mode based on output from the canceling.

In one embodiment, the method further includes performing detection of discontinuous transmission based on the determined uplink noise power.

In one embodiment, the method further includes performing a signal processing operation based on the determined uplink noise power.

At least some embodiments relate to an uplink receiver.

In one embodiment, the uplink receiver includes a first despreader configured to receive signals from an user equipment, and configured to despread the received signals using an unused channelization code.

In one embodiment, uplink receiver further includes a second despreader configured to despread the received signals to obtain a data signal, and a noise cancellation unit configured to cancel noise power from power of the data signal based on output from the first and second despreaders.

In one embodiment, uplink receiver further includes a second despreader configured to despread the received signals to obtain a control signal, and a noise cancellation unit configured to cancel noise power from power of the control signal based on output from the first and second despreaders.

In one embodiment, the uplink receiver further includes a detector configured to detect discontinuous transmission based on the determined uplink noise power.

In one embodiment, the uplink receiver further includes a second despreader configured to despread the received signals to obtain a user equipment signal, a noise cancellation unit configured to cancel noise power from power of the user equipment signal, and a detector configured to detect whether the user equipment is operating in a power limited mode based on output of the noise cancellation unit.

In one embodiment, the uplink receiver further includes a second despreader configured to despread the received signals to obtain a data signal, a third despreader configured to despread the received signals to obtain a control signal, and a noise cancellation unit configured to cancel noise power from data signal power and control signal power based on output from the first through third despreaders. The uplink receiver further includes a detector configured to detect whether the user equipment is operating in a power limited mode based on output of the noise cancellation unit.

In one embodiment, the uplink receiver further includes a power determination unit configured to determine noise signal power based on output from the first despreader.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the example embodiments and wherein.

DETAILED DESCRIPTION OF THE EMBODIMENTS

Figure 1:
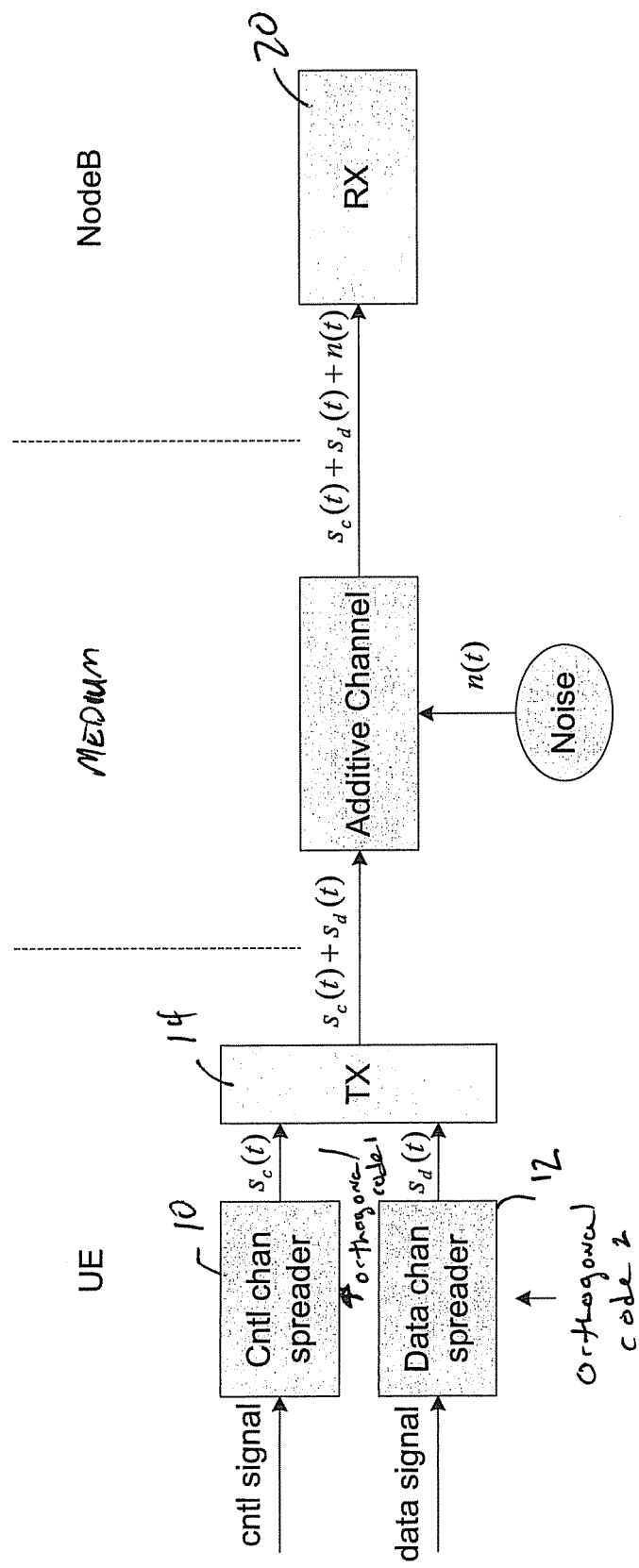
FIG. 1 illustrates a channel model for a WCDMA system.
Figure 2:
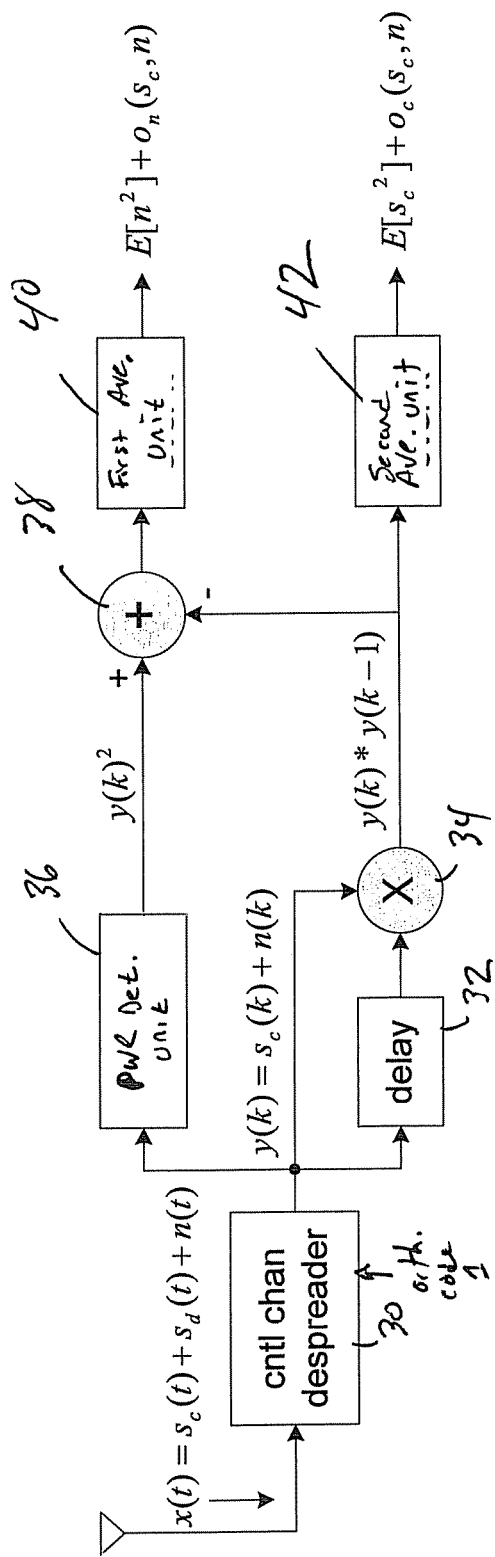
FIG. 2 illustrates a prior art solution for determining noise power in a WCDMA system.

Detailed illustrative embodiments are disclosed herein. However, specific structural and functional details disclosed herein are merely representative for purposes of describing example embodiments. An embodiment may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Exemplary embodiments are discussed herein as being implemented in a suitable computing environment. Although not required, exemplary embodiments will be described in the general context of computer-executable instructions, such as sections, program modules or functional processes, being executed by one or more computer processors or CPUs. Generally, sections, program modules or functional processes include routines, programs, objects, components, data structures, etc. that performs particular tasks or implement particular abstract data types. The sections, program modules and functional processes discussed herein may be implemented using existing hardware in existing communication networks. For example, sections, program modules and functional processes discussed herein may be implemented using existing hardware at existing network elements, servers or control nodes. Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "user equipment (UE)" may be considered synonymous to, and may hereafter be occasionally referred to, as a mobile, mobile unit, mobile station, mobile user, access terminal (AT), subscriber, user, remote station, receiver, etc., and may describe a remote user of wireless resources in a wireless communication network. The term, "base station (BS)" may be considered synonymous to and/or referred to as a base transceiver station (BTS), NodeB, access node (AN), eNodeB, etc. and may describe equipment that provides data and/or voice connectivity between a network and one or more users.

As is well-known in the art, each of the user equipment and the base station may have transmission and reception capabilities. Transmission from the base station to the UE is referred to as downlink or forward link communication. Transmission from the UE to the base station is referred to as uplink or reverse link communication.

According to at least some example embodiments, instead of using a correlation function, the receiver creates a new virtual noise channel by despreading received signals using an unused channelization code. This noise channelization code has not been used in transmission by the user equipment (UE) transmitter and may be thought of, therefore, as a virtual noise channel. For example, the channelization code may be from the orthogonal channel code set defined by the standard. Therefore, this noise channelization code is orthogonal to all user control and data channels. Since the UE transmitter never physically sends out a signal with the noise channelization code, the receiver noise channel output will not include any user channel signals, and therefore, represents the channel noise, n(t).

Figure 3:
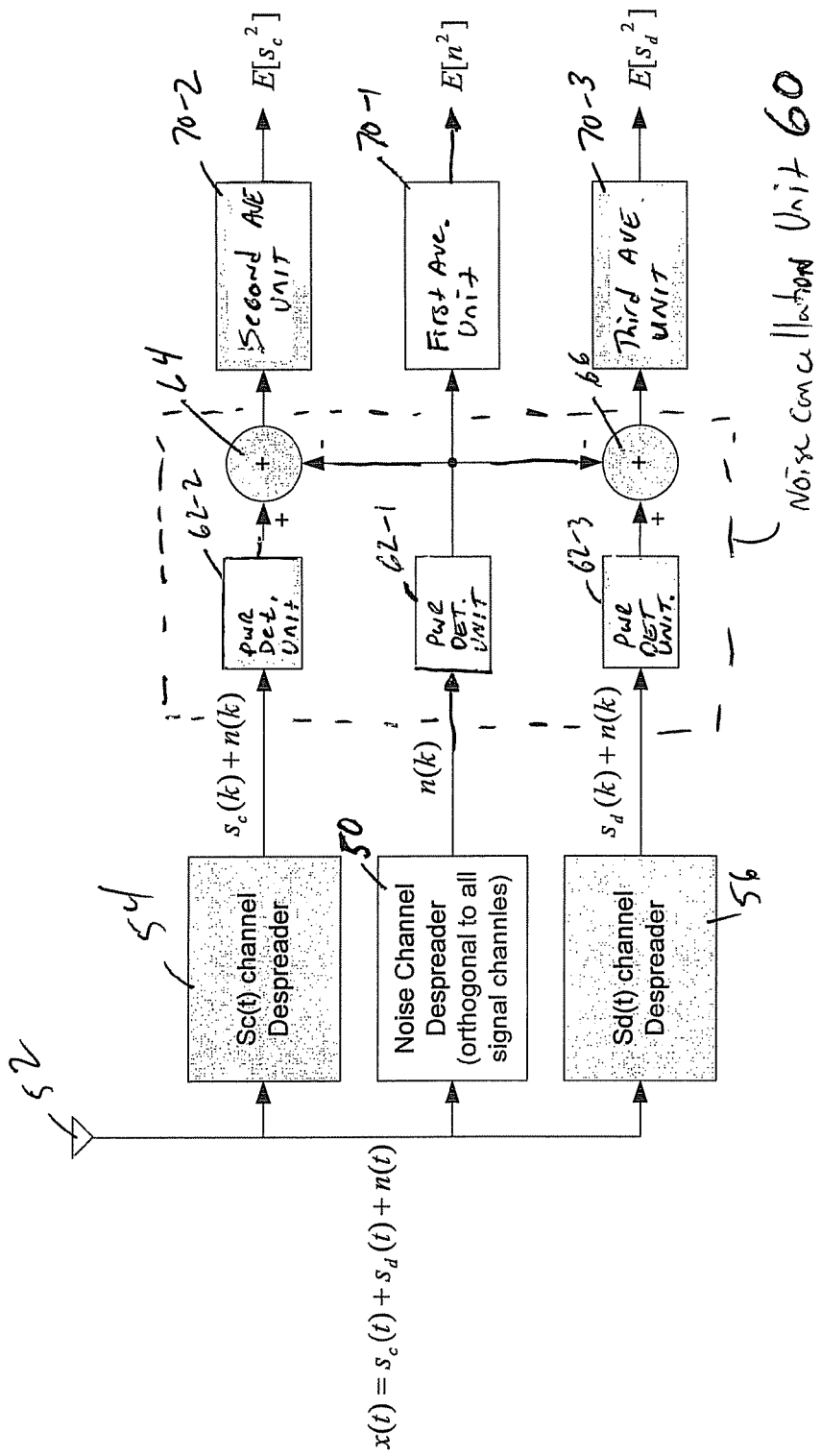
FIG. 3 illustrates a portion of an uplink receiver for determining noise power in a WCDMA system according to an embodiment.

FIG. 3 illustrates a portion of an uplink receiver for determining noise power in a WCDMA system according to an embodiment. FIG. 3 illustrates a portion of one finger of the receiver, and it will be understood that the structure of FIG. 3 may be replicated for each of a plurality of fingers. As shown, a first despreader 50 receives signals received by an antenna 52. The first despreader 50 applies an unused orthogonal channel code to the received signals. The orthogonal code may be any well-known orthogonal code such as a Walsh code, etc. As mentioned above, various standards may provide a set of orthogonal codes. The first despreader 50 selects a code from this set that is not used in transmitting the signals received at the antenna 52. Accordingly, output from the first despreader will be just the noise, n(k). There is no correlation remainder $o_n(Sc, n)$ as in existing solution. This removes assumption 1 for noise power estimation in the existing solution.

FIG. 3 also shows second and third despreaders 54 and 56 using respective orthogonal codes to despread a control signal Sc(k) and a data signal Sd(k), respectively. A noise cancellation unit 60 receives the noise signal, the control signal and the data signal. The noise cancellation unit 60 includes power determining units 62-1 to 62-3 determine the power of the noise signal, the control signal and the data signal, respectively, on a symbol-by-symbol basis. For example, in one embodiment, the power determining units 62 may square the respective signal to obtain the signal power. A first combiner 64 subtracts the noise power output by the noise power determining unit 62-1 from the control signal power output by the control signal power determining unit 62-2 to cancel the noise power from the control signal power. The first combiner 64 outputs a modified control signal power from which noise has been cancelled. Similarly, a second combiner 66 subtracts the noise power output by the noise power determining unit 62-1 from the control signal power output by the data signal power determining unit 62-3 to cancel the noise power from the data signal power. The second combiner 66 outputs a modified data signal power from which noise has been cancelled. Note that this noise power determination and cancellation works for any signal symbol without a need to know the signal bits. This removes assumption 2 in the existing solution that needs to know the signal bits, such as pilot bits etc. However, if the signal is known, like a pilot signal, the pilot symbols may be adjusted to line up on the same bits and accumulated. This is called coherent accumulation. The coherent accumulation may be squared to obtain a coherent power. Accordingly, the power determined units 62 may perform coherent or non-coherent power estimation based on whether the received signal is known.

First through third average determining units 70-1 to 70-3 may determine the average noise power, average control signal power and the average data signal power, respectively, over a desired number of symbols.

While, this embodiment was described with respect to a single data signal and a single control signal, it will be understood that this embodiment is not limited to a single data signal and/or a single control signal.

In wireless communication systems such as a WCDMA system, there are many signal processing operations that rely on accurate noise power and signal power estimation. Accordingly, the noise power and/or signal power generated according to the above embodiments may be used in any of these well-known operations.

Figure 4:
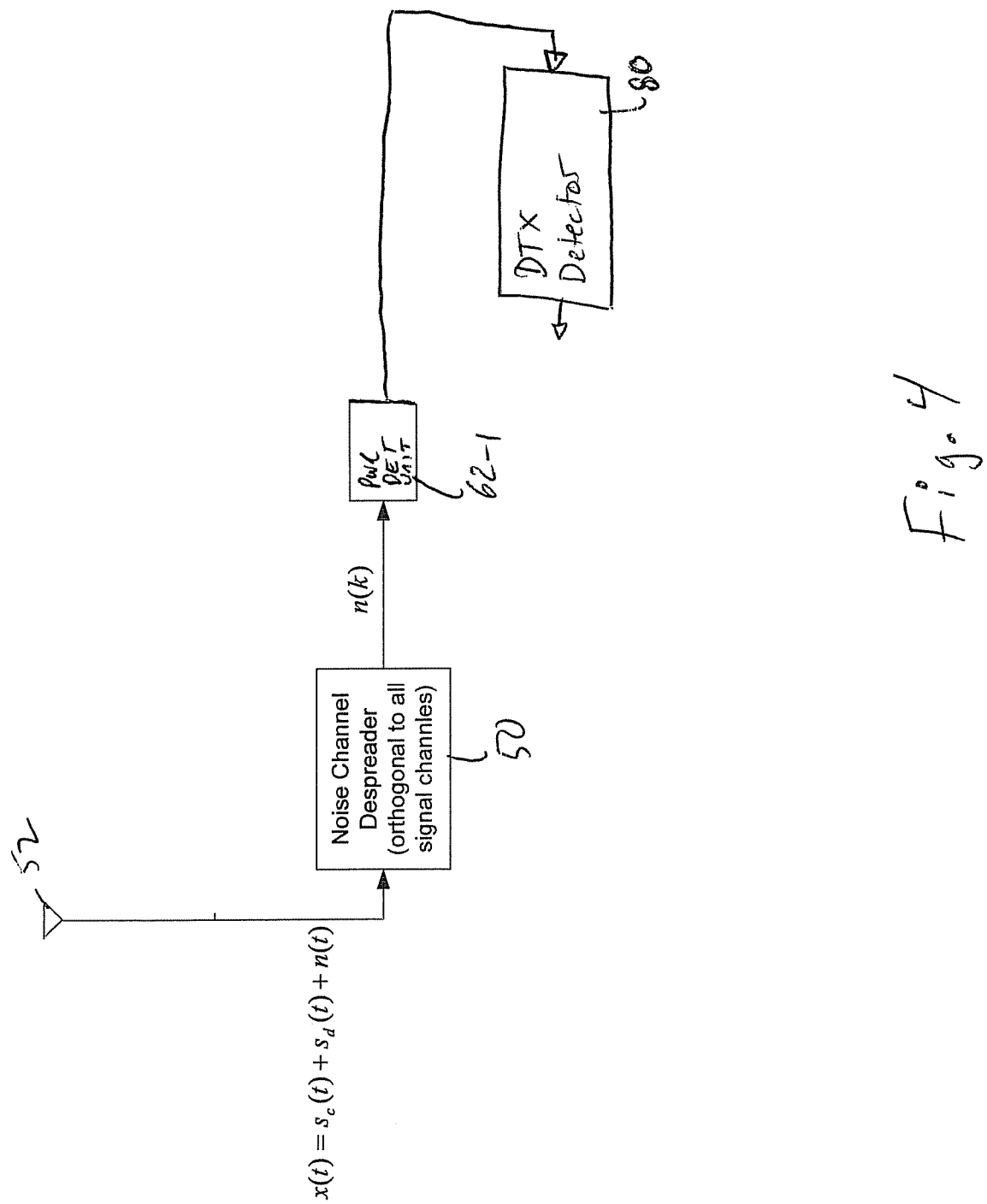
FIG. 4 illustrates an embodiment for determining discontinuous transmission.

For example, FIG. 4 illustrates an embodiment for determining discontinuous transmission. In order for the UE to save battery power and reduce cross channel interference, the UE and NodeB may stop transmitting signals for some slots and frames. The receiver must real-time measure the noise power, and channel signal power to detect and control the non-transmitting symbols (DTX symbols). This requires real-time detection without processing delay. FIG. 4 shows generating the noise power in the same manner described above with respect to FIG. 3 with the addition of a DTX detector 80. The DTX detector 80 performs any well-known DTX detection operation based on noise power, where the noise power used is that generated according to an embodiment. For example, DTX detection may be performed in the same manner as described in U.S. Pat. No. 7,782,820, the entire contents of which are hereby incorporated by reference, except that the noise power generated according to an embodiment is used instead of the noise power disclosed in U.S. Pat. No. 7,782,820.

Figure 5:
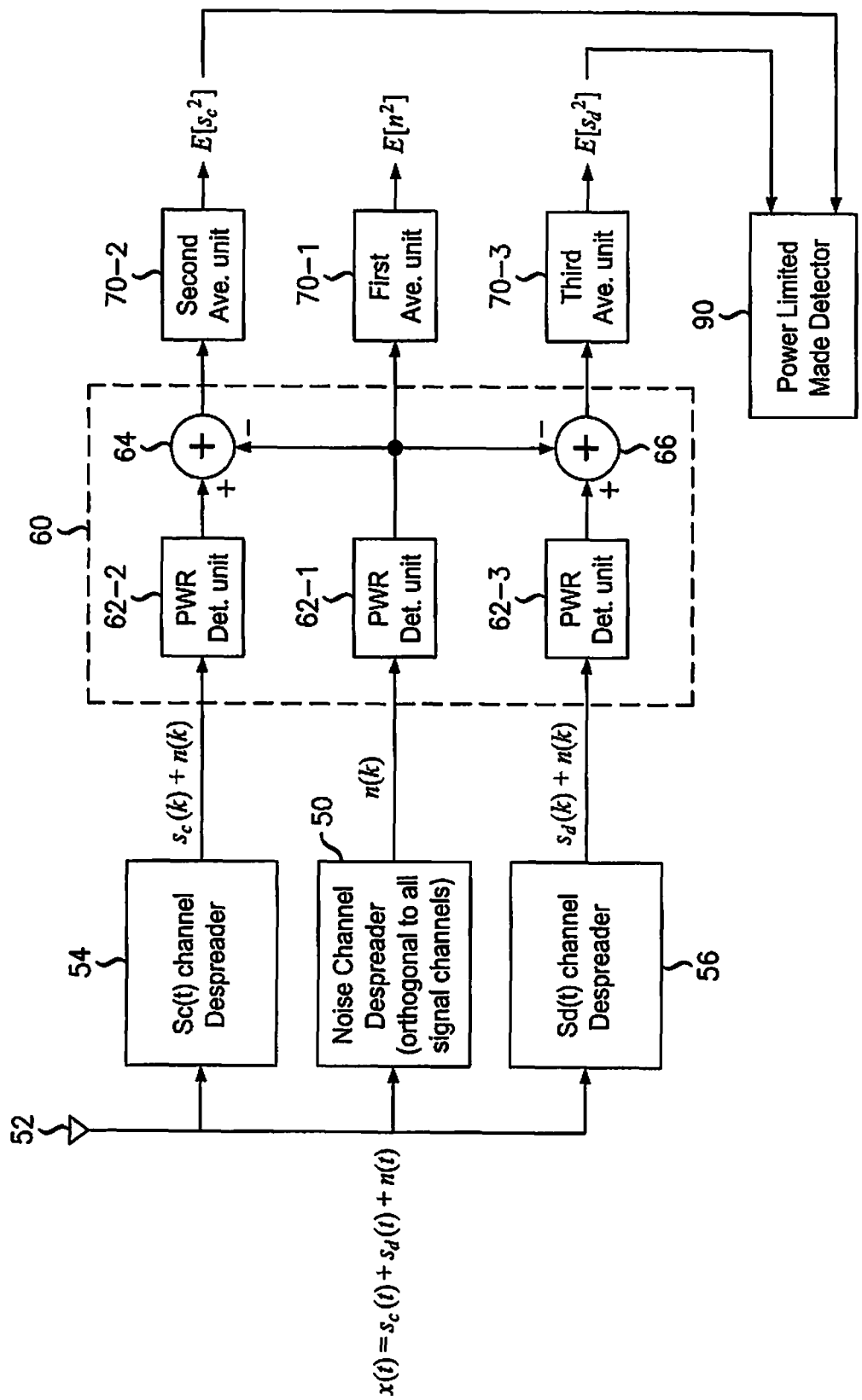
FIG. 5 illustrates an embodiment for determining whether the user equipment is operating in a power limited mode.

As a further example, FIG. 5 illustrates an embodiment for determining whether the user equipment is operating in a power limited mode. As shown, the embodiment of FIG. 5 is the same as the embodiment of FIG. 3 except that the embodiment of FIG. 5 further includes a power limited mode detector 90. To save battery power, a UE may operate in a power limited mode. In this case, the UE transmitting power may not follow the original TPR (Traffic to Pilot Ratio, such as EDP-DCH-to-DPCCH channel power ratio) as instructed during the initial link configuration. In this case, power limited mode detector 90 receives the EDPDCH data channel power and the DPCCH control channel power, determines the data-to-control channel power ratio $E[S_d^2]/E[S_c^2]$, and detects the UE is operating in a power limited mode if the ratio is less than a desired threshold. Upon detection, the NodeB may perform corresponding adjustment for the UE power limited mode.

In an alternative embodiment, the power limited mode detector 90 may detect the power limited mode based on the power of a single UE signal such as the data channel power $E[S_d^2]$. For example, if the data signal power $E[S_d^2]$ is less than a desired threshold, the power limited mode detector 90 determines the UE is operation in the power limited mode.

The invention being thus described, it will be obvious that the same may be varied in many ways. For example, while the embodiments were described as applied to a WCDMA system, the invention is not limited to WCDMA. Also, while described a applied to the uplink, the embodiments may also be applied to the downlink. Such variations are not to be regarded as a departure from the invention, and all such modifications are intended to be included within the scope of the invention.

We claim:

1. A method of determining uplink noise power in a wireless communication system, comprising:
    receiving signals from user equipment;
    despreading the received signals by applying an unused channelization code;
    determining the uplink noise power based on output of the despreading;
    canceling noise power from a data signal power in the received signals based on the determined uplink noise power to produce a modified data signal power;
    canceling noise power from a control signal power in the received signals based on the determined uplink noise power to produce a modified control signal power; and
    detecting whether the user equipment is operating in a power limited mode based on the modified data signal power and the modified control signal power.

2. The method of claim 1, further comprising:
    selecting a channelization code from a set of orthogonal channelization codes such that the selected channelization code is currently unused.

3. The method of claim 1, wherein the canceling cancels the determined uplink noise power from the power of the at least two signals on a symbol-by-symbol basis.

4. The method of claim 1, further comprising:
    performing detection of discontinuous transmission based on the determined uplink noise power.

5. The method of claim 1, further comprising:
    performing a signal processing operation based on the determined uplink noise power.

6. An uplink receiver, comprising:
    a first despreader configured to receive signals from a user equipment, and configured to despread the received signals using an unused channelization code;
    a second despreader configured to despread the received signals to obtain a data signal;
    a third despreader configured to despread the received signals to obtain a control signal;
    a noise cancellation unit configured to cancel noise power from data signal power and control signal power based on output from the first through third despreaders; and
    a detector configured to detect whether the user equipment is operating in a power limited mode based on output of the noise cancellation unit.

7. The uplink receiver of claim 6, further comprising:
    an averaging unit configured to average output from the noise cancellation unit over a number of symbols.

8. The uplink receiver of claim 6, further comprising:
    a detector configured to detect discontinuous transmission based on the determined noise power.

9. The uplink receiver of claim 6, further comprising:
    an averaging unit configured to average output from the noise cancellation unit over a number of symbols.

* * * * *